United States Patent Office 3,120,431
Patented Feb. 4, 1964

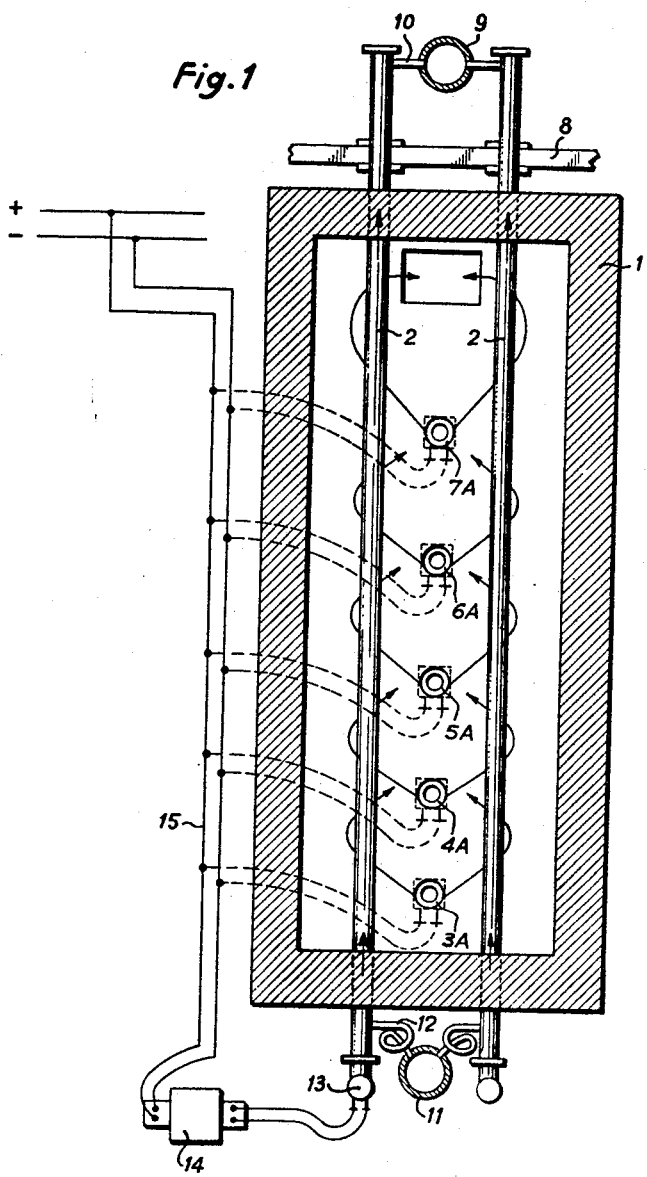
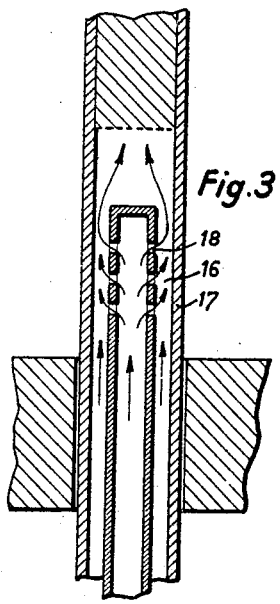

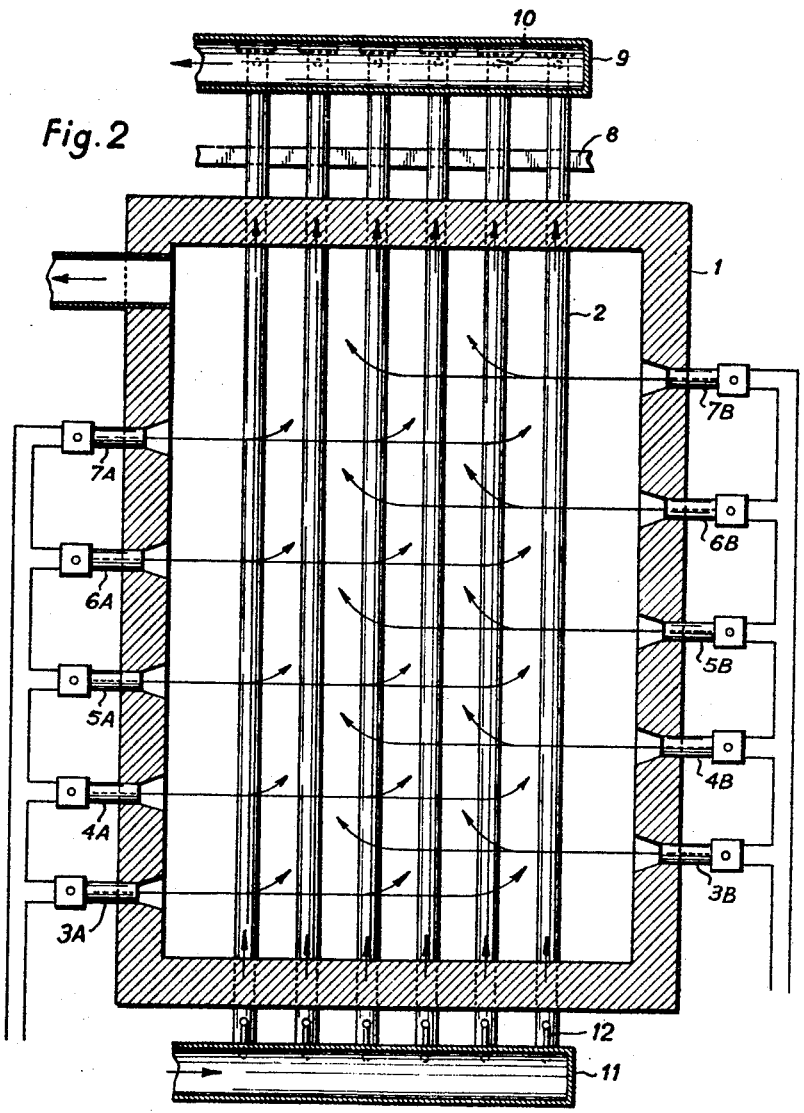

3,120,431
METHOD FOR CONVERTING HYDROCARBONS
Pierre Carton and Marcel Jean, Paris, and Eugene Louis Garon, La Garenne-Colombes, France, assignors to Societe Chimique de la Grande Paroisse, Azote et Produits Chimiques
Filed Nov. 27, 1959, Ser. No. 855,668
Claims priority, application France Dec. 5, 1958
4 Claims. (Cl. 48—196)

Our invention has for its object a method for converting hydrocarbons through steam or carbon dioxide into hydrogen and carbon monoxide and it relates more particularly to the so-called "reforming method" according to which the reaction is performed at a high temperature under pressure in a series of vertical tubes containing a catalyst for said reaction, the high temperature required being obtained through an external heating of the tubes through the agency of burners fed with liquid or gasiform fuel and housed inside the wall of a furnace. Our invention covers also a catalytic reforming furnace designed for the execution of said method.

It is a well-known fact that the oxidation of hydrocarbons through steam or carbon dioxide, is performed in accordance with the endothermic reactions:

$$C_nH_{2m} + pH_2O = (p-n)CO_2 + (2n-p)CO + (m+p)H_2 \quad (1)$$
$$C_nH_{2m} + nCO_2 = 2nCO + mH_2 \quad (2)$$

which may be written as follows in the case of methane:

$$CH_4 + H_2O = CO + 3H_2$$
$$CH_4 + CO_2 = 2CO + 2H_2$$

The gases obtained through the above reaction may serve for various chemical syntheses, for instance for the synthesis of ammonia after conversion of the carbon monoxide through steam and addition of nitrogen, for the synthesis of methanol, or again, the synthesis of liquid fuel through the so-called Fischer reaction.

Such subsequent syntheses being performed under pressure, it is of considerable interest to execute also the reforming reaction under pressure, which allows obtaining directly large volumes of gases under pressure and reducing considerably the cost price of raising the gases to the utilisation pressure. Such a rise in pressure would, in fact, act in an unfavorable manner on the equilibrium of the reaction by reason of the increase in volume accompanying the latter. The equation of partial pressures may be written as follows:

$$K_{(t)} = \frac{P_{CO_2} \cdot (P_{H_2})^4}{P_{CH_4} \cdot (P_{H_2O})^2}$$

In order to obtain low final contents of methane, an excess of steam should be resorted to, but the latter reacts in its turn on the proportion of carbon dioxide and carbon monoxide in the transformed gasiform mixture, as a result of the conversion reaction:

$$CO + H_2O = CO_2 + H_2$$

The reforming reactions can be executed with a sufficient yield only at a high temperature and in the presence of a catalyst. The mixture of gases is caused to pass through tubular elements of refractory steel filled with the catalyst, which elements are to resist the pressure inside them in spite of the very high temperature to which they are subjected, say 850 to 900° C. and more. By reason of the risk of breaking of the tubes under such extreme conditions, the reforming has been executed hitherto, generally speaking, only under pressures approximating atmospheric pressure. Even when it has been proposed to execute a reforming under pressure, there has been provided a circulation of reacting gases in a downward direction, the combustion gases produced by the burners of the heating furnace flowing in counter-current relationship upwardly, so that the maximum temperature consistent with the resistance of the tubes against creep could be reached only for a reduced height of said tubes. The rate of conversion of the hydrocarbons is not fully satisfactory under such operative conditions. It is necessary, furthermore, to cut out any risk of breaking of the tubes which may arise, chiefly by reason of the slow transformation of the refractory nickel-chromium steel generally used for such tubes, which steel becomes gradually brittle through the formation of its sigma phase, so that it is necessary to provide safety devices which are generally intricate and expensive and exert a detrimental action on the transmission of heat to the tubes inside which the reaction is to proceed.

Now, our invention allows executing a reforming of hydrocarbons through steam and, if required, carbon dioxide, under pressure and at a comparatively high temperature, while obtaining however an excellent conversion yield, without it being necessary to run any serious risk of a breaking of the tubes in which the reaction proceeds. It allows obtaining mixtures of hydrogen and carbon monoxide containing a very small amount of residuary hydrocarbons, under a pressure which is comparatively high, of a magnitude, for instance, of 10 absolute kilogrammes per square centimeter, said mixtures being available for chemical synthesis reactions after a mere further compression by a smaller ratio than the ratios required hitherto. Our invention allows furthermore making use of a comparatively compact apparatus providing a great reliability in operation.

Our improved method consists in that the reaction gases and the combustion gases produced by the burners flow upwardly in the same direction, while the temperature of the tube walls is maintained at a substantially constant value throughout the height of the heating furnace.

The temperature of the tube walls is maintained at the desired constant value throughout the section of their height extending inside the heating furnace by suitably distributing the burners in a vertical direction and/or the input of fuel and air fed to said burners. The major fraction of the endothermic conversion is performed at the input end of the stream of reaction gases inside the tubes and, therefore, in the lower ends of the latter, so that a larger amount of heat is applied to the lower section of the furnace by inserting in said lower section burners lying comparatively near each other and/or having a large heat-producing capacity. The burners should, in contradistinction, be more widely spaced and/or have a lesser heat producing capacity in the upper section of the furnace in which a lesser application of heat is required for the end of the reaction. The substantially constant temperature required throughput the height of the tubes is practically the maximum temperature consistent with a sufficient resistance to creep of the refractory metal forming the tubes.

It will be remarked that, for maintaining the temperature of the tubes at a constant high value throughout their height, it is necessary to exhaust out of the heating furnace combustion gases at a very high temperature and this leads to a loss of heat which is larger than with the methods according to which the temperature of the tubes is not held at a constant value and the combustion gases produced by the burners flow in counter-current relationship with reference to the reacting mixture. The increase in the heat-producing capacity thus required is however negligible when compared with the advantage of obtaining gasiform mixtures under pressure with a high rate of conversion.

When resorting to furnaces constituted by multiple cells each of a comparatively reduced cross-section and requiring each only a small number of reaction tubes, it is often found that the wall of each cell facing the burners is locally brought to a temperature which is far higher than that of the adjacent areas and this is ascribable to the radiation of the burner nozzles and to the impact of the hot gases; there is therefore a local tendency to an overheating of certain areas of the outer surface of the tube or tubes facing the over-heated sections of the cell walls.

According to a further feature of our invention, the reaction tubes may, in contradistinction, be housed inside cells of a preferably rectangular shape and said tubes form two rows parallel with the longer longitudinal walls of the cells, while the burners are located along the medial vertical lines of the shorter transverse walls or near the latter, the levels at which the burners lie on the two walls being arranged in vertical alternation. The transverse walls facing the burners are thus sufficiently spaced for their temperature not to substantially differ from that of the adjacent areas which are not subjected to the impact of the burnt gases or are less subjected to the direct radiation of the heat of the burner nozzles. Furthermore, the vertical staggered fitting of the burners on the opposite transverse walls with reference to each other prevents the flaming jets issuing out of them from facing each other on a same line which would lead to the production of localised areas subjected to violent turbulency.

Care should be taken to prevent the walls of the tubes from being brought fortuitously to a temperature above their creep limit, with a view to cutting out any risk of deformation and, possibly, of breaking of the tubes. The throughput of the heating fluid should be controlled preferably through automatic arrangements governed by the temperature of the tubes, either indirectly through the agency instruments measuring the temperature of the furnace walls, or else, directly, through means sensitive to the thermic expansion of the tubes.

The metal forming the tubes should be of a satisfactory grade, as far as resistance to creep at the high temperatures of use and, also, high resistance to any oxidizing corrosion are concerned; said tubes are generally executed with refractory nickel-chromium steel improved, if desired, through the addition of cobalt, molybdenum, titanium, aluminium or silicon. In order to prevent the tubes from becoming brittle at a raised temperature under the action of the slow formation of the sigma phase, there is used preferably, according to an advantageous feature of our invention, a refractory steel of this type wherein the chromium content is under 23%; it has been found, as a matter of fact, that with such a composition, the sigma phase did not appear.

By reason of the comparatively high pressure and temperature required for executing our method, the reaction tubes have preferably a comparatively thick wall with a comparatively small diameter, of a magnitude of say 100 to 150 mm.; this allows subjecting the metal only to a reduced mechanical straining, which cuts out any risk of creep of the metal which is maintained at a high temperature; this ensures, furthermore, a proper homogeneity of the temperature of the gasiform stream throughout any predetermined cross-section of any tube, so that large differences in temperature are avoided between the peripheral layers of the gas which are heated to a maximum by the heat radiated by the wall and the axial section of the gasiform stream heated only through a stirring with the peripheral gasiform section of the stream. It is also possible to use for the same purpose the known arrangement according to which each of the reaction tubes is associated with a thin axial tube of a comparatively small diameter occupying, in practice, the entire length of the tube, said axial tube serving either for the introduction into the tube of the gas to be treated, previously heated to a high temperature, or for the extraction of the mixture after reaction.

When it is desired to obtain a converted gas with low content of methane, it is necessary, with a view to modifying the chemical equilibrium in the desired direction, to introduce into the mixture to be treated a large proportion of steam and this results in an increase of the output of gases by weight and, consequently, an increase of the drop in pressure across the catalyst layers inside the tubes. In order to reduce said drop in pressure to an allowable minimum value, we resort advantageously to catalyst-carrying tubes which are clearly shorter than the tubes serving for the reforming at pressures approximating atmospheric pressure. It is also possible to reduce the length of the catalyst-carrying tube sections to a fraction such as the ¾ or ⅔ of the total length of the tube extending inside the furnace.

The diameter and the length of the heated section of the reaction tubes may be modified in accordance with the actual application considered. Thus, in the case of furnaces intended for the preparation of mixtures with very low methane content, or else, of furnaces intended for the treatment of heavy hydrocarbons which are readily dissociated with a formation of free carbon and the conversion of which requires the incorporation of a large proportion of steam, we select tubes of a small diameter, say 80 to 120 mm. with a heated section of a reduced length, say 4 to 6 meters. In the case of furnaces intended for the obtention of a mixture containing still a substantial proportion of methane, say 5 to 10% or more, as in the case of a town gas-generating plant, or else, when the reforming is to be followed by a post-combustion, we select preferably tubes of a larger diameter, say 100 to 180 mm., and the operative length is larger and reaches, say 5 to 8 meters. It is then possible, in fact, to reduce the proportion of steam incorporated with the original gasiform mixture, which reduces the drop in pressure across the layer of catalyst, or else, it is possible to make the metal of the tube work under greater strains by increasing the diameter of the tube, without changing its thickness, or else, by reducing its thickness, while retaining its diameter.

In certain cases, it is necessary to treat gasiform mixtures which are very sensitive to overheating and which would have a tendency to dissociate with a formation of free carbon if they were brought in contact with the catalyst at a temperature lower than the critical temperature below which the formation of carbon black is possible inside the atmosphere considered. This is the case, in particular, for the higher hydrocarbons or for mixtures with large content of carbon monoxide. It is necessary in such a case to provide in any well-known manner for a preliminary preheating of the gas to be treated up to a temperature approximating the critical temperature before it is set in contact with the catalyst. This preliminary heating may be terminated prior to the input into the reaction tube and before any contact with the catalyst, through a circulation of thin layers of the gases over a predetermined length between the heating tubes and inner coaxial cylindrical walls. It is also possible to subject the steam to a separate preliminary heating at a comparatively high temperature, the dissociatable gas being heated, on the other hand, up to a temperature slightly lower than the critical temperature, after which said gas is admitted gradually inside the catalyst-carrying tube through a series of successive points, so that, after incorporation with the steam, the mixture lies at a temperature above the threshold of the reaction of carbon with steam in accordance with the method disclosed in the French Patent No. 1,073,309, dated May 4, 1951. It may also occur that it is desired to treat gasiform mixtures containing hydrocarbons and hydrogen, together with carbon dioxide or carbon monoxide in large proportions; in such a case, the contact between the catalyst at the temperature corresponding to the threshold of activity of the latter may lead to the progression of the reactions in the direction opposed to the desired direction in accordance with the following equations:

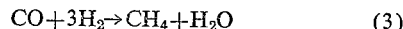
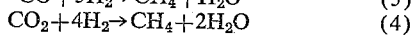

$$CO+3H_2 \rightarrow CH_4+H_2O \qquad (3)$$
$$CO_2+4H_2 \rightarrow CH_4+2H_2O \qquad (4)$$

These methane-forming reactions which are highly exothermic would cooperate in the production of a speedy rise in the temperature of the gasiform stream up to the moment at which the composition of the mixture reaches the equilibrium corresponding to its temperature. It is only beyond said point that the application of external heat would be capable of reversing the reaction in the desired direction. Now, it would be necessary, in such a case to supply the gas starting from the point of reversal of the direction of reaction, with an increased amount of heat equal to the sum of the heat normally supplied and of the heat produced by the undesired formation of methane according to the reactions (3) and (4). In order to cut out this drawback which would lead to the use of longer tubes, it is preferable to provide a preliminary heating of the gasiform mixture, so as to bring the latter to a temperature equal to or slightly above that corresponding to an equilibrium in its composition corresponding to the actual composition of the mixture to be treated. Said preliminary heating at the start may be ensured in the same manner as that referred to hereinabove.

Another preferred embodiment of our invention consists in the means for securing the tubes and connecting them with the corresponding gas input and output headers. The tubes are secured to a carrying frame through their upper ends, forming the output ends for the hot gases, in a comparatively rigid manner, whereby the connection between the upper sections of the tubes and the output header may be provided between two stationary points and be subjected only to a minimum deformation; in contradistinction, the connection between the lower ends of the tubes which are shiftable, so as to allow thermal expansion of the latter, and the stationary gas input header should be sufficiently yielding for it to match the displacements of the lower ends of the tube, without any too high tensioning; the execution of such a yielding connection is furthered by the fact that the preheated gases are introduced into the input header at a temperature which is substantially lower than the reaction temperature, generally between 400 and 550° C., which allows using connecting tubes made of a metal retaining a high mechanical resistance and a satisfactory elasticity under the conditions of use.

We will now describe two applications of our improved method, which are disclosed by mere way of exemplification and without any binding sense being attached thereto.

*Example 1.*—A reforming furnace intended for the treatment, under a pressure of 10 atmospheres, of an hourly throughput of 1,200 cubic meters of natural methane, as measured under normal temperature and pressure conditions, by means of 3,750 cubic meters per hour of steam, is constituted by two rectangular cells measuring 4.70 meters by length, and 2.30 meters by breadth, the walls of which are made of refractory bricks carried by a thermally insulated casing of metal sheet.

FIGS. 1 and 2 illustrate diagrammatically the inner arrangement of one of said cells shown in elevational views, respectively along its minor side and along its major side. FIGURE 3 Illustrates in detail one form of reactor tube according to the invention having a coaxial cylindrical member within the tube at its inlet end. Each of the cells contains inside the refractory walls of the chamber 1, twelve tubes 2 of refractory steel containing 18% of chromium and 36% of nickel, each tube having an inner diameter of 120 mm. and a total length of 8.50 meters, of which 7 meters extend between the hearth and vault of the furnace; said tubes are formed in two parallel rows including each six tubes spaced from one another by about 600 mm., said rows standing in two vertical planes parallel with the longitudinal longer side of the chamber at a distance of about 500 mm. from the latter. The tubes are filled in their section inside the furnace with uniform granules of a suitable catalyst, the active substance of which has a nickel base.

The tubes are secured rigidly through their upper ends extending outside the furnace to a steel beam 8 lying above said furnace and they are connected with the header 9 collecting the output gases passing out of said tubes by means of comparatively rigid tubes 10. The lower ends of the tubes 2 are adapted to expand freely and they are connected to this end with the header 11 through which the gases enter the apparatus by means of comparatively yielding tubes 12 forming a suitably shaped convolution. Since the gases enter the header 11 at a comparatively low temperature, the tubes 12 may be made of a suitable elastic steel, such as an alloy steel containing 18% of chromium and 8% of nickel.

Each cell is heated through the agency of two vertical rows of five burners producing a short flame, said burners burning hourly altogether 600 cubic meters of natural gas and being carried by the two walls of the cell chamber standing transversely, the burners carried by each transverse wall lying along a medial longitudinal vertical plane of said shorter transverse wall.

The burners are arranged vertically in a non-uniform manner, since they are closer together in the lower section of the furnace where the absorption of heat corresponding to the endothermic conversion of the hydrocarbons is larger than in the upper section adjacent the output of the gases, in which upper section the reaction is nearer final equilibrium and is operative only for a small proportion of the gasiform hydrocarbons. The heat-producing capacity of the burners adjacent the input area is furthermore selected so as to be larger than that of the burners in the upper section. The vertical distribution of the burners and the inputs of gas into the latter on the two cooperating transverse walls are as follows:

| No. of the burner | Height above the hearth (m.) | | Throughput of burnt gases (in cub. m. per hour) |
|---|---|---|---|
| | Surface A | Surface B | |
| 3A | 0.6 | | 30 |
| 3B | | 1.1 | 38 |
| 4A | 1.6 | | 39 |
| 4B | | 2.15 | 39 |
| 5A | 2.7 | | 35 |
| 5B | | 3.3 | 31 |
| 6A | 3.9 | | 24 |
| 6B | | 4.5 | 24 |
| 7A | 5.15 | | 22 |
| 7B | | 5.8 | 18 |

Said burners are provided with diaphragms and with automatic adjusting means which allow subjecting the header distributing the heating gases feeding the burners to a pressure varying in accordance with the modifications of the input of the mixture containing the hydrocarbons to be treated, with a view to maintaining constant the temperature of the reaction tubes throughout their length without any risk of a local overheating.

The temperature of the metal forming the reaction tubes is normally maintained at about 800 to 850° C.

There is also provided an arrangement for limiting the input of the heating gases under the control of the expansion of the tubes measured at the end of one of them at 13, said arrangement being adapted to adjust, through the agency of the control means 14 and of the electric circuit 15, the input of gas into the burners 3 to 7, so as to maintain the temperature of the tubes underneath the limit value above which the metal might creep to an objectionable extent. The temperature acting on the control means may as well be measured on one of the walls of the heating cell.

Under such conditions, there is obtained at the output of the furnace an hourly output of 4,100 cubic meters of gas, as measured under normal pressure and temperature conditions and the composition of which is approximately:

$CO_2$: 11%; CO: 9%; $H_2$: 71%; $CH_4$: 8%; $N_2$: 1% diluted with 2,500 cubic meters per hour of steam.

When it is desired to use such gases for the synthesis of ammonia or of methanol, in which case the proportion of methane should be reduced as much as possible, we may feed the hot gasiform mixture obtained at the output into a post-combustion chamber constituted by a metal container lined inwardly with insulating refractory bricks and filled with a suitable catalyst and into which we inject further, so as to intimately admix it with said hot gasiform mixture, an oxidizing gas constituted by air or oxygen, or again, air diluted with nitrogen or combustion gases. If it is desired to produce a mixture intended for the synthesis of ammonia, the inputs of air and nitrogen should be adjusted in a manner such that the proportion of CO+$H_2$ with reference to $N_2$ in the mixture obtained may approximate 3/1, while the proportion of oxygen should be adjusted so that no excess of oxygen may be present which allows lowering the contents of methane down to the desired amount, without any exaggerated combustion of hydrogen.

If it is desired, on the other hand, to obtain a mixture intended for the synthesis of methanol or for a synthesis of the Fischer type, it is possible to incorporate with the fluid entering the post-combustion chamber a mixture of $CO_2$ with oxygen, the amount of $CO_2$ being adjusted so as to shift the equilibrium between CO and $H_2$ as a consequence of the progression of a reaction such as:

$$CO_2 + CH_4 \rightarrow 2CO + H_2$$

The endothermic character of said transformation is compensated and the rising of the temperature corresponding to final equilibrium is obtained through the combustion of a fraction of the gases by the oxygen introduced into the mixture.

*Example 2.*—In this case, we start from an hourly input of 2,500 cubic meters, measured under normal temperature and pressure conditions, of gases forming a residuum of other productions, available under a pressure of 8 atmospheres and the composition of which is:

CO: 31.2%; $H_2$: 50.5%; $CH_4$: 16.4% hydrocarbons of the $C_2$ type: 0.9%; $N_2$+A: 1% so as to obtain a compressed mixture adapted to be directly used for the synthesis of methanol.

The gas is moistened under the same pressure by means of an abundant sprinkling of water heated by the thermal recovery of the heat of the transformed gas, after which its contents of steam are brought to the desired value corresponding to contents of 2.25 metric tons per hour of steam, the dew point of the gas being then equal to 145° C.

The mixture is then subjected to a preliminary heating up to about 500° C. through counter-current heat exchange with the converted gas passing out of the catalytically reforming furnace and it is then distributed through two parallel headers into a system of forty vertical catalyst-containing tubes of refractory steel, said tubes having an inner diameter of 100 mm. and a total length of 6.50 meters. Said tubes are furthermore filled over 4.50 meters with a nickel-containing catalyst in uniform granules and they are distributed between two furnace cells having a rectangular cross-section and made of refractory bricks. Each cell includes two rows of ten vertical tubes spaced by about 40 cm. with reference to the two longer walls of each cell. The two shorter walls of each cell carry each a vertical series of four burners producing 100,000 to 250,000 calories per hour. The upper burners are less powerful and more widely spaced and the spacing of the burners is adjusted in a manner such that, under normal operative conditions, a uniform temperature of the magnitude of 850° C. may be maintained on the walls of the catalyst-carrying tubes.

The furnace used for the example considered includes rectangular cells, but, obviously, it is possible to restort to furnaces having a circular cross-section, provided the temperature of the tubes remains homogeneous under reliable conditions. The vertical sections of the different catalyst-carrying tubes which are heated through radiation extend over a height of 5 meters between the hearth at the bottom and the lower surface of the vault, but the catalyst layer is carried by an open-work grid located at about 50 cm. above the upper surface of the hearth; the gases at a temperature of about 500° C. entering the lower ends of the tubes are fed thereto by a series of distributing tubes forming one or more convolutions which are sufficiently yielding and allow a free expansion of the catalyst-carrying tubes fed by them without any abnormal straining.

As shown in FIGURE 3, the gases flow first through an annular gap 16 of a narrow cross-section between the wall 17 of each catalyst-carrying tube and a corresponding coaxial cylindrical member 18.

The circulation of the gases inside said annular gaps heated by the radiation of the walls lying above the level of the furnace hearth raises the temperature of the gasiform stream from 500° C. up to about 680° C., said temperature corresponding substantially to equilibrium of the composition of the mixture entering the apparatus: $CO + H_2 + CH_4H_2O$.

The mixture enters then the catalyst layer under conditions such that the partial conversion into methane of the components CO+$H_2$ existing in the mixture fed into the apparatus is prevented and, consequently, as soon as the catalyst is in contact with gases, the reaction proceeds in the desired direction under the action of the outer application of heat.

The two upper headers corresponding to the two cells are fed, when considered together, by the totality of the treated gases which are then directed towards the heat exchangers and towards the means recovering the sensible heat of the gases and the latent heat of the steam containing in the latter.

There is obtained, finally, an hourly ouput of 4,100 cubic meters of gases under an output pressure of about 7 atmospheres, the composition of said gases being approximately as follows:

$CO_2$=10%; CO=19%; $H_2$=69; $CH_4$+$N_2$+Ar=2% such gases being perfectly suitable without any further treatment for the synthesis of about 1500 kilogrammes of methanol per hour.

Automatic means controlled by the expansion of the tubes as a function of their temperature reduce the amount of heating or stop the latter and may, if desired, reduce the pressure in the tubes in the case of any superheating.

It would be, of course, possible to execute the conversion under a higher pressure and it would then be necessary to increase the wall thickness of the reaction tubes, so as to keep their stresses down to an allowable figure. It would also be necessary, as a consequence of the laws of equilibrium for the reaction considered, either to increase the proportion of steam to be used, or else, to admit higher contents of methane in the final gas obtained, or else, to select an intermediate position between these two possible adjustments.

What we claim is:

1. A method for the catalytic reforming under pressure of hydrocarbons for obtaining hydrogen-carbon monoxide mixtures, comprising: forming a mixture of gasiform hydrocarbons with an oxidizing gas including at least one gas of the group consisting of steam and carbon dioxide, constraining said mixture to flow upwardly inside a plurality of vertical tubes over a catalyst for the reforming reaction, burning fuel at several successive levels near said tubes to form a stream of hot combustion gases flowing around said tubes in the same direction as said mixture passing over the catalyst and in indirect heat-exchange relationship with said mixture to reform the latter and adjusting the heat inputs of said combustion gases for maintaining the temperature of the outside surface of said tubes at a substantially constant value over the entire length thereof in which the catalytic reforming is being executed.

2. A method for the catalytic reforming under pressure of hydrocarbons for obtaining hydrogen-carbon monoxide mixtures, comprising: forming a mixture of gasiform hydrocarbons with an oxidizing gas including at least one gas of the group consisting of steam and carbon dioxide, constraining said mixture to flow upwardly inside a plurality of vertical tubes over a catalyst for the reforming reaction, burning fuel at several successive levels near said tubes to form a stream of hot combustion gases flowing around said tubes in the same direction as said mixture passing over the catalyst and in indirect heat-exchange relationship with said mixture to reform the latter, and adjusting automatically the amounts of fuel to be burnt to produce the heating gases, in accordance with the temperature of a surface in direct contact with the combustion gases, to provide thereby substantial constancy of the temperature of said tubes throughout the entire length of their path in which the catalytic reforming is being executed.

3. A method for the catalytic reforming under pressure of hydrocarbons for obtaining hydrogen-carbon monoxide mixtures, comprising: forming a mixture of gasiform hydrocarbons with an oxidizing gas including at least one gas of the group consisting of steam and carbon dioxide, constraining said mixture to flow upwardly inside a plurality of vertical tubes over a catalyst for the reforming reaction, burning, at various levels of a heating zone surrounding said vertical tubes, a fuel with an oxygen-containing gas to form a stream of hot combustion gases flowing upwardly around said tubes, the fuel burning levels being distributed from bottom to top of said heating zone with gradually increasing vertical spacings in a manner such that the temperature of the outside surface of said tubes is maintained at a substantially constant value throughout the entire length of its path in which the catalytic reforming is being executed.

4. A method for the catalytic reforming under pressure of hydrocarbons for obtaining hydrogen-carbon monoxide mixtures, comprising: forming a mixture of gasiform hydrocarbons with an oxidizing gas including at least one gas of the group consisting of steam and carbon dioxide, constraining said mixture to flow upwardly inside a plurality of vertical tubes over a catalyst for the reforming reaction, burning, at various levels of a heating zone surrounding said vertical tubes, a fuel with an oxygen-containing gas to form a stream of hot combustion gases flowing upwardly around said tubes in the same direction as said mixture passing over the catalyst and in indirect heat exchange relationship with said mixture to reform the latter, and adjusting automatically the flow of fuel and oxygen-containing gas at each one of said various levels in a manner such that the temperature of the outside surface of said tubes is maintained at a substantially constant value throughout the entire length of its path in which the catalytic reforming is being executed.

References Cited in the file of this patent
UNITED STATES PATENTS

| | | |
|---|---|---|
| 1,959,151 | Beekley | May 15, 1934 |
| 2,028,326 | Hanks et al. | Jan. 21, 1936 |
| 2,645,566 | Stookey | July 14, 1953 |
| 2,654,657 | Reed | Oct. 6, 1953 |